UNITED STATES PATENT OFFICE.

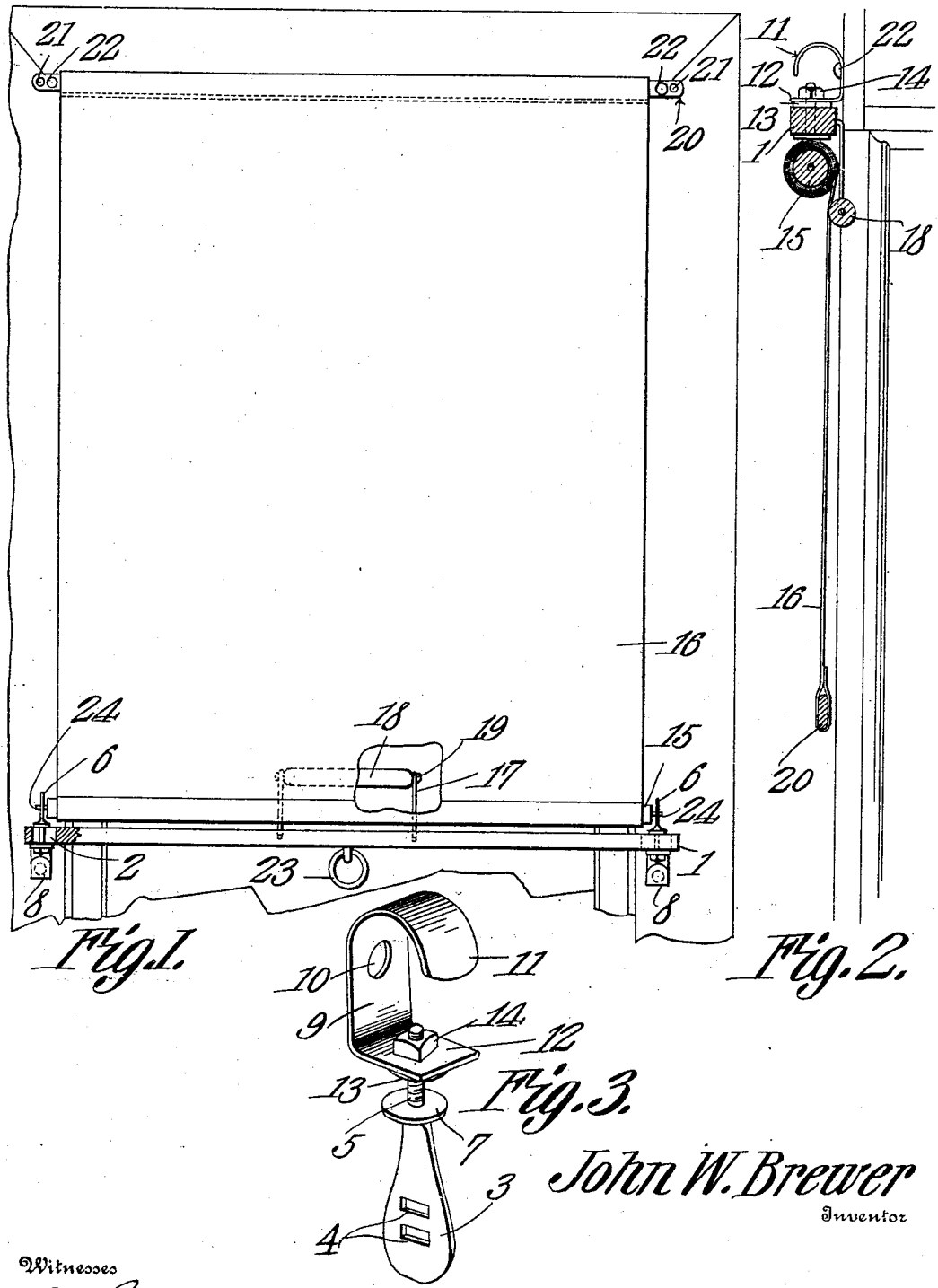

JOHN W. BREWER, OF CEDARTOWN, GEORGIA.

SHADE-ROLLER FRAME.

No. 930,143.     Specification of Letters Patent.     Patented Aug. 3, 1909.

Application filed February 15, 1909. Serial No. 477,994.

*To all whom it may concern:*

Be it known that I, JOHN W. BREWER, a citizen of the United States, residing at Cedartown, in the county of Polk and State of Georgia, have invented a new and useful Shade-Roller Frame, of which the following is a specification.

The objects of the invention are, generally, the provision in a merchantable form of a device of the class above specified, which shall be inexpensive to manufacture, facile in operation and devoid of complicated parts; specifically, the provision of a shade adapted to be turned end for end upon a window, and of novel means for mounting, controlling, and operating the shade; other and further objects being made manifest hereinafter as the description of the invention progresses.

The invention consists in the novel construction and arrangement of parts hereinafter described, delineated in the accompanying drawings and particularly pointed out in that portion of this instrument wherein patentable novelty is claimed for certain distinctive features of the device, it being understood that within the scope of what is thus hereinafter claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings, Figure 1 shows my invention in front elevation. Fig. 2 is a transverse section of the device, the same being mounted in a reversed position from that shown in Fig. 1. Fig. 3 is a detail perspective of the bracket and of the supporting element which is designed to be assembled therewith.

In carrying out my invention I provide primarily a holder 1 designed to be mounted transversely of the frame of the window. This holder 1 is provided near its terminals with longitudinally disposed slots 2 designed to receive adjustably the brackets hereinafter described. The bracket 6 comprises a flat head 3 having a series of apertures 4 designed to receive the terminal of the shaft upon which the shade is wound. In Fig. 3 these apertures 4 are delineated as being polygonal in form, but it is to be understood that in the other bracket the apertures 4 are to be circular in form in order to receive for rotation the other terminal of the shaft upon which the shade is wound, the illustration of so common an expedient being considered unnecessary. The flat head 3 is diminished in breadth at one end and merges into a threaded shank 5. At the point where the head merges into the shank the device is provided with a flat base 7 which may be formed integral with the shank and the head; if desired however this flat base 7 may take the form of a simple washer having a central aperture arranged to receive the shank 5. The suspension member 8 comprises a body 9 having an aperture 10, the upper terminal of the body 9 being over-bent to form a hook 11. The lower end of the body 9 is bent at right angles to the body proper and is provided with an aperture designed to receive the threaded shank 5. If desired, a washer 13 may be mounted upon the threaded shank 5 between the holder 1 and the lower end 12 of the body of the suspension member. The suspension member may be assembled with the bracket by means of a nut 14 arranged to engage the upper terminal of the threaded shank 5 and to bear upon the upper face of the lower end 12 of the suspension member. The shaft 15 upon which the shade 16 is wound in its preferred form consists of a common spring actuated shade roller. I further provide a bracket comprising arms 17 adapted to be introduced into the rear face of the holder 1 intermediate its ends and between the arms 17 is journaled for rotation a roller 18 which may be held in place in the bracket by means of screws 19 or like devices. The end of the shade 16 which is free from the shaft 15 is thickened, and this thickening may be accomplished by the insertion into the free end of the shade, of a strip 20. This strip 20 is arranged to extend laterally beyond the shade 16 and this laterally extending portion is provided with apertures 21 designed to receive a screw or like means whereby the device may be suspended, the supporting screw being indicated by the numeral 22 in the drawings.

Referring now to Fig. 2 it will be seen that my invention may be mounted upon a window frame in the usual manner the holder 1 being disposed at the top of the frame. When assembled in this manner the element 22 is introduced into the frame of the window at its top and the holder suspended therefrom by means of the apertures 10. The shade 16 may be grasped at 20 and the same lowered and raised in the usual manner. The roller 18 is so disposed relative to the shade 16 that when the said shade 16 is raised or lowered it bears upon and passes over the roller 18. By this operation the shade 16 is maintained in a smooth condition, wrinkles being avoided and the life of the shade materially prolonged thereby. The arms 17 of the bracket whereon the roller 18 is mounted are so disposed relative to the shaft 15 that the strip 20 cannot pass between said arms and the shaft. By this construction it is impossible for the free terminal of the shade to pass upward and become wedged in an inconvenient position between the shaft 15 and the holder 1, or, should the space between the shaft and the holder be sufficient for the free terminal of the shade to pass therebetween, for the free end of the shade to be carried around repeatedly with the shaft 15 destroying the effect of the actuating spring and rendering the rewinding of the same necessary.

Referring now to Fig. 1 it will be seen that the shade may be turned end for end the strip in such case being mounted upon the window frame and the holder 1 hanging freely pendent therefrom. By providing a plurality of apertures 21 in the strip 20 it is possible to mount the said strip 20 upon the same nails or screws which held the device in position when mounted as shown in Fig. 3. By this construction the mutilation of the window frame is reduced to a minimum. When assembled in this manner with the holder 1 at the lower end of the shade, the roller 18 not only serves to smooth out the curtain as hereinbefore pointed out, but at the same time serves by bearing upon the back of the shade to maintain the holder in a proper position and further to prevent the holder from being upturned and rolled up with the shade 16 should for any reason the spindles 24 of the shaft 15 fail to rotate properly in the apertures 4 of the bracket. The holder 1 should be provided with a ring 23 or like member to provide a suitable hand-hold for the raising and lowering of the shade.

The threaded shank 5 of the bracket is adapted to slide in the apertures 2 of the holder 1 and by this means shade rollers of different lengths may be accommodated by the same holder. Furthermore by providing a plurality of apertures 4 in the head 3 of the bracket a curtain roller of any diameter may be accommodated and a shade of any length wound thereon.

It will be seen that by the construction hereinbefore pointed out it is possible to mount a shade upon a window in four different positions; either end of the shade being placed upward and either side thereof being disposed outward. The device is so constructed that the shade will hang close to the window frame and effectually screen the window from exterior observers.

By the use of the device herein described it becomes unnecessary to shorten the shade rollers to fit a particular window and the trouble incident to mounting shade brackets of the common form is obviated.

The suspension member 8 is so formed that it may readily be mounted upon the casing of the window, the apertures 10 in the suspension member furnishing a means to that end, the hook 7 being adapted to be brought into engagement with a rod, screw-eye, hook or other suitable supporting means.

Having thus described my invention what I claim as new and desire to protect by Letters Patent is:

1. In a device of the class described, a holder; a shaft journaled for rotation upon the holder; a shade wound upon the shaft; a strip carried by the free end of the shade; the holder and the strip being provided with vertically alined suspension means, whereby the holder and the strip may be mounted interchangeably upon a support; and a roller carried by the holder and being positioned to contact with the shade as it is unwound from the shaft.

2. In a device of the class described, a holder longitudinally slotted near its terminals; a pair of brackets each having a shank arranged to be adjustably mounted in one of the slots; suspension means carried by the brackets, a shaft journaled for rotation between the brackets; a shade wound upon the shaft; a strip carried by the free end of the shade the said strip being provided at each end with multiple suspension means, whereby the strip and the holder may be mounted interchangeably upon a support.

3. In a device of the class described, a holder longitudinally slotted near its terminals; a pair of brackets each having a shank arranged to be adjustably mounted in one of the slots; suspension means carried by the brackets, a shaft journaled for rotation between the brackets; a shade wound upon the shaft; a strip carried by the free end of the shade, the said strip being provided at each end with multiple suspension means, whereby the strip and the holder may be mounted interchangeably upon a support; and a roller carried by the holder and being positioned to contact with the shade as it is unwound from the shaft.

4. In a device of the class described, a curtain bracket comprising a flat head having a shaft receiving aperture and being provided with a threaded shank and with a flat face disposed adjacent thereto; a suspension member comprising an apertured body hooked at its upper end, the lower terminal of the body being bent at right angles to the body proper and being apertured to receive the shank; and a nut to engage the terminal of the shank.

In testimony that I claim the foregoing as my own, I have hereto affixed my signature in the presence of two witnesses.

JOHN W. BREWER.

Witnesses:
G. R. HUTCHENS,
RUTH COLEMAN.